(No Model.)

G. S. BRIGGS.
TIRE UPSETTER.

No. 543,078. Patented July 23, 1895.

Witnesses:
D. Blinn
E. Behel

Inventor:
George S. Briggs
By A. O. Behel
atty.

United States Patent Office.

GEORGE S. BRIGGS, OF ROCKFORD, ILLINOIS.

TIRE-UPSETTER.

SPECIFICATION forming part of Letters Patent No. 543,078, dated July 23, 1895.

Application filed March 1, 1895. Serial No. 540,144. (No model.)

*To all whom it may concern:*

Be it known that I, GEORGE S. BRIGGS, a citizen of the United States, residing at Rockford, in the county of Winnebago and State of Illinois, have invented certain new and useful Improvements in Tire-Shrinkers, of which the following is a specification.

The object of this invention is to provide a shoe overlying the rest for the tire in order that the tire may be held from kinking during the shrinking process.

Figure 1:
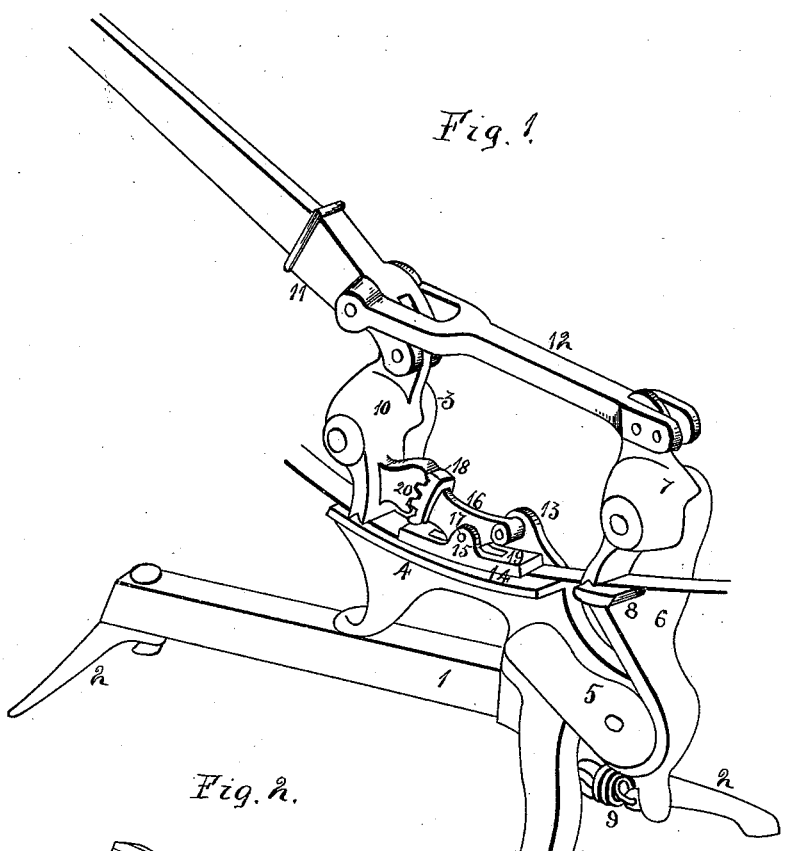
Figure 2:
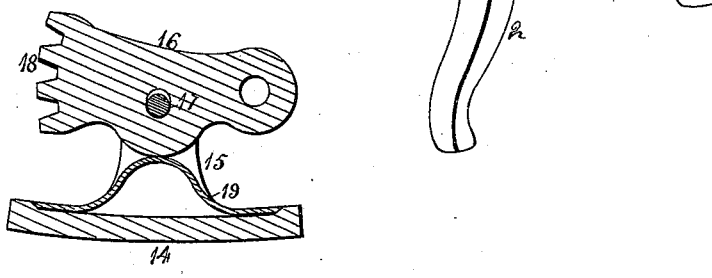

In the accompanying drawings, Figure 1 is an isometrical representation of a tire-shrinker embodying my invention. Fig. 2 is a vertical section of the movable shoe.

The tire-shrinker, in the main, is of an old construction to which I have applied my improved movable shoe. The shrinker consists of the main frame 1, supported upon legs 2 and having an ear or upward projection 3. A shelf or ledge 4 extends in substantially a horizontal plane curved to conform approximately to the form of the tire. A projection 5 extends from the end of the frame and has an arm 6 pivoted thereto, which extends in an upward direction, and to its upper end is pivoted a dog 7, having its lower end overlying a projection 8. The lower end of the arm 6 is held in a yielding manner by the spring 9, connected thereto at one end, its other end being connected to the main frame. To the upper end of the ear 3 is pivoted a dog 10, its lower end overlying the shelf 4. To this dog is pivotally connected a hand-lever 11, and the hand-lever has a connection with the dog 7 by the link 12.

The tire to be shrunk is placed upon the ledge 4 and projection 8. The hand-lever is moved down, causing the dogs to come in contact with the tire, and a further downward movement of the hand-lever will move the arm 6 upon its pivotal connection with the supporting-frame, carrying the dog 7 with it, which will cause the distance between the dogs to be lessened, consequently upsetting the tire to that extent. In use it has been demonstrated that that portion of the tire between the dogs is apt to buckle or kink and not keep its shape during the shrinking process, and it is to overcome this difficulty that I have applied my improvements, which will now be explained.

From the main frame rises an ear 13. A shoe 14 is located over the ledge 4 between the dogs 7 and 10 and has uprising ears 15. A lever 16 has a pivotal connection with the shoe by a pin 17 passing through it and the ears 15. The opening in the lever is somewhat enlarged for a purpose to appear hereinafter. One end of this lever has a pivotal connection with the ear 13 and its other end is provided with teeth 18. Between the ears 15 of the shoe and beneath the pivot of the lever 16 is located a curved spring 19, resting in contact with the lever. From the dog 10, on its side facing the dog 7, extends a projection provided with teeth 20, which mesh with the teeth of the lever 16.

In the movement of the dog 10 in clamping the tire to the ledge 4 its toothed connection with the lever 16 will cause it to move upon its pivotal connection with the ear 13, rising from the main frame, and will depress the shoe in contact with the tire and hold it in such position, while the further movement of the dog 7 will shrink the tire. This shoe prevents the upward kinking or buckling of the tire. Upon releasing the tire the dog 10 will elevate the shoe sufficiently to allow the removal of the tire and the insertion of a new one. The spring 19 is made of sufficient strength to resist the upward force of the tire, if of a size adapted to the size of the machine; but if a greater pressure be exerted the spring will yield sufficiently to prevent the breakage of the machine.

I claim as my invention—

In a tire shrinker, the combination of a suitable frame, a support for the tire, two pivoted dogs, a hand lever pivotally connected with one of the dogs, a link pivotally connected at one end to the other dog, and at its other end to the hand lever, a vertically movable shoe overlying that portion of the tire located between the dogs, and means forming a connection between the shoe and movable portion of the shrinker for operating the shoe automatically.

GEORGE S. BRIGGS.

Witnesses:
A. O. BEHEL,
E. BEHEL.